W. LEVY AND M. CORTESE.
TRACTION LUG.
APPLICATION FILED MAY 19, 1920.
1,369,623.
Patented Feb. 22, 1921.
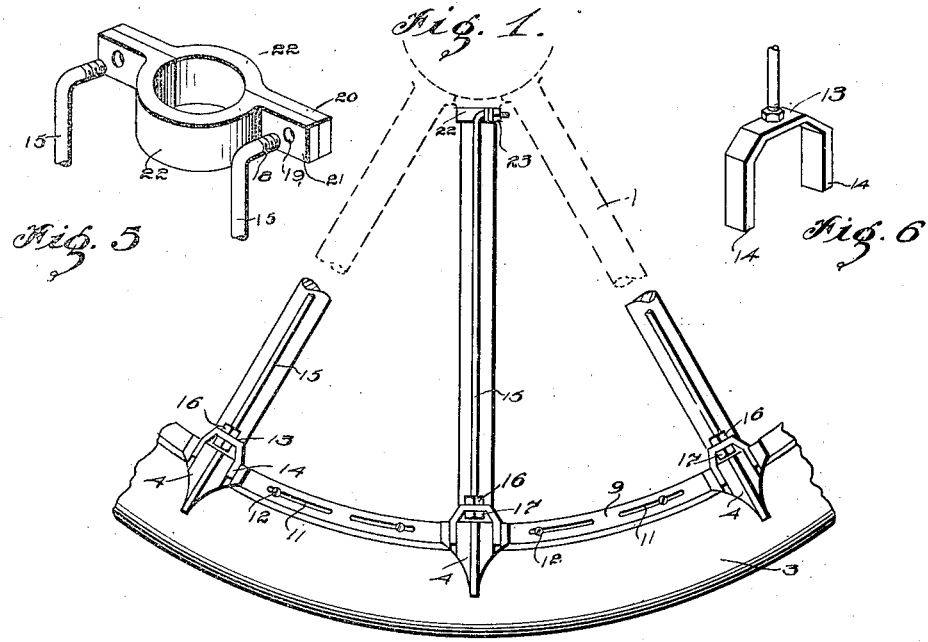
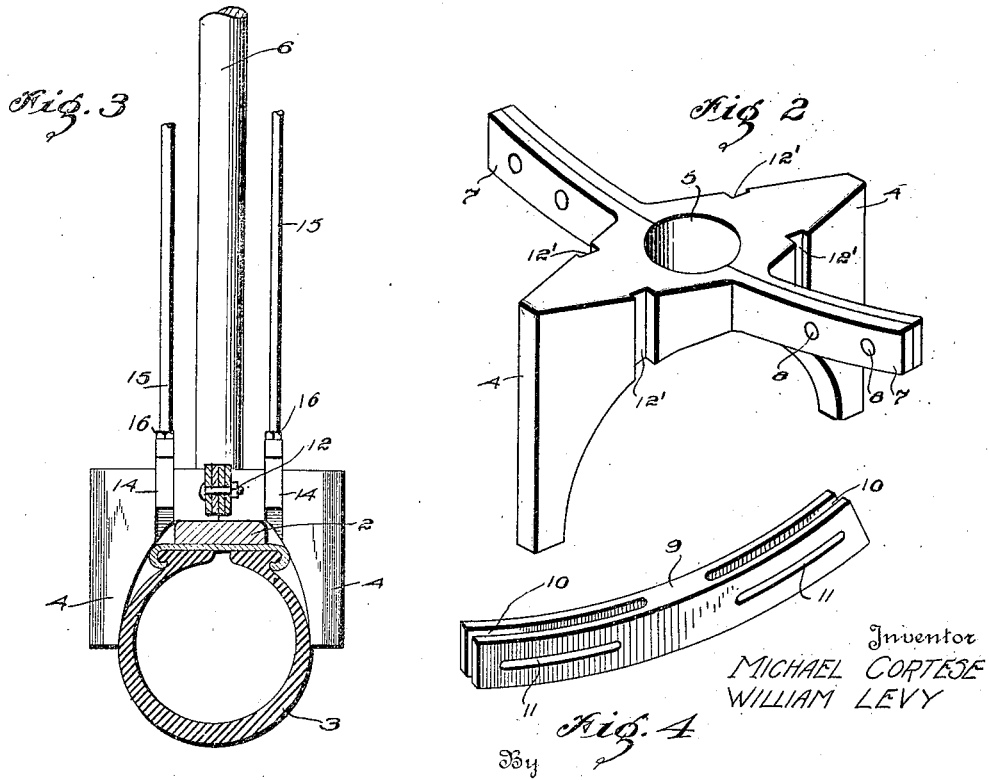
Inventor
MICHAEL CORTESE
WILLIAM LEVY

UNITED STATES PATENT OFFICE.

WILLIAM LEVY AND MICHAEL CORTESE, OF PATERSON, NEW JERSEY; SAID CORTESE ASSIGNOR TO SAID LEVY.

TRACTION-LUG.

1,369,623. Specification of Letters Patent. Patented Feb. 22, 1921.

Application filed May 19, 1920. Serial No. 382,662.

*To all whom it may concern:*

Be it known that we, WILLIAM LEVY and MICHAEL CORTESE, citizens of the United States, residing at Paterson, in the county of Passaic and State of New Jersey, have invented certain new and useful Improvements in Traction-Lugs, of which the following is a specification.

This invention relates to traction lugs or wheel attachments, and it comprises a pair of lugs adapted to be arranged on each side of the tire, and extend outwardly beyond the rim of the wheel, the inner portions being provided with recesses to receive the spokes of the wheel, and being further provided with extending arms adapted to be positioned on the inside of the felly of the wheel, the arms being provided with openings for the reception of bolts, slotted connecting plates connecting the arms of one pair of lugs to the arms of the next adjacent pair, bolts or other fastening means arranged in said slots and in the openings in said arms, the lugs being provided with radial slots on each side, a yoke or strap adapted to be received in said slots, and a supporting rod secured to each of said yokes and adapted to maintain said attachment in position.

It is an object of the present invention to produce a device of this character which may be readily applied to various types and sizes of wheels and which may be removed and replaced in very little time, and by the operator of the machine, or one not necessarily skilled in mechanics.

The invention comprises a pair of complementary members which carry the traction lugs and are arranged on each side of the spoke, and means for securing the traction lug arranged near one spoke to the traction lug arranged around the next spoke, including a slotted connecting plate which permits adjustment of the attachment on wheels of different sizes.

In the accompanying drawings, we have shown one embodiment of the invention. In this showing, Figure 1 is a partial side elevation of a vehicle wheel showing the invention applied.

Fig. 2 is a perspective view of the traction lug removed from the wheel.

Fig. 3 is a vertical transverse sectional view of a wheel rim and tire showing the device applied.

Fig. 4 is a detail perspective view of the slotted connecting plate.

Fig. 5 is a detail view of a supporting means for the reinforcing rods, and

Fig. 6 is a detail perspective view of the yoke or strap.

Referring to the drawings, the reference numeral 1 designates a vehicle wheel having a rim 2 and tire 3. The traction lugs are adapted to extend outwardly beyond the rim, as is the usual construction, whereby they are brought in contact with the ground when the wheel enters a rut or is running in soft ground, or in snowy weather, and the like.

As shown, the lugs 4 are provided with complementary recesses 5 adapted to receive the spoke 6 of the wheel. Each of the lugs is provided with a pair of oppositely extending arms 7 having openings 8 for the reception of fastening means. As shown in Fig. 1 of the drawings, these arms 7 are adapted to lie within the inner rim or wheel felly and substantially conform to the outline of the felly. A plurality of these lugs is employed, it being best to employ a pair of lugs for each spoke of the wheel, and connecting means are provided for connecting the arms 7 from one pair of traction lugs to the arms of the next adjacent pair. As shown, the connecting plate 9 is provided with recesses 10 arranged in each end and adapted to receive the arms 7. Slots 11 are arranged in the connecting plates adjacent the recesses, whereby bolts or other fastening means 12 may be passed through the slots and through the openings in the arms to secure the two members in proper position. It is readily apparent that the provision of elongated slots will permit adjustment of the attachment to wheels of various sizes.

Means are also provided for retaining the lug or attachment in proper position adjacent the rim of the wheel. As shown, each of the lugs is provided with a pair of vertical slots or grooves 12'. A connecting member consisting of a strap or yoke 13 having downwardly projecting arms 14 is provided, the arms 14 being adapted to enter the grooves 12'. A rod 15 is connected to each of these yokes or straps, the rods extending substantially parallel to the spoke of the wheel. This member may be secured to the yoke by any suitable means, and as shown, the end of the rod is threaded and is adapted to receive nuts 16 and 17, arranged above and below the yoke. The upper end of the rod is offset as at 18 (see Fig. 6) and is adapted to enter registering openings 19, arranged near the ends of plates 20 and 21. These two plates are bent or curved as at 22, and are adapted to be arranged around the spoke. A nut 23 may be arranged upon the threaded end of the rod 15, whereby the entire construction herein described produces a very efficient attachment for automobiles and the like for the purpose of preventing tie-ups, due to muddy roads. The device is also very effective as a traction lug during snow storms and enables the user of an ordinary motor vehicle to travel through heavy snows without the usual difficulties experienced in driving. The lugs arranged at right angles to the direction of travel give a very positive grip on the snow or other material on the road, and the vehicle is propelled forward without difficulty.

It is to be understood that while we have described the preferred embodiment of our invention, various changes in the shape, size, and arrangement of parts may be resorted to without departing from the spirit of the invention as defined by the scope of the subjoined claims.

Having thus described our invention, what we claim is:

1. A traction lug for vehicle wheels, comprising a pair of complementary sections having a spoke receiving recess, arms carried by said sections and extending in opposite directions, and slotted connecting plates adapted to receive the arms of adjacent lugs.

2. A traction lug for vehicle wheels, comprising a pair of complementary sections having a spoke receiving recess, arms carried by said sections and extending in opposite directions, said arms being arranged on the inside of the felly of the wheel, a curved plate having a recess for the reception of said arms at each end, and elongated slots for the reception of fastening elements.

3. A traction lug for vehicle wheels, comprising a pair of complementary sections having a spoke receiving recess, each section being provided with a pair of grooves, a connecting member arranged in said grooves, and a supporting rod secured thereto and extending substantially parallel to the spoke, and means for securing said parts in position.

4. A traction lug for vehicle wheels, comprising a pair of complementary sections having a spoke receiving recess, each section being provided with a pair of grooves, a yoke having arms entering said grooves, and a supporting rod secured thereto and extending substantially parallel to the spoke, and means for securing said parts in position.

In testimony whereof we affix our signatures in presence of two witnesses.

WILLIAM LEVY.
MICHAEL CORTESE.

Witnesses:
FRANK P. ROMANO,
CECELIA ROMANO.